(12) United States Patent
Stavila et al.

(10) Patent No.: US 11,267,702 B1
(45) Date of Patent: Mar. 8, 2022

(54) SOLID STATE SYNTHESIS OF METAL BOROHYDRIDES

(71) Applicant: National Technology & Engineering Solutions of Sandia, LLC, Albuquerque, NM (US)

(72) Inventors: Vitalie Stavila, Pleasanton, CA (US); James Lawrence White, Fremont, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 857 days.

(21) Appl. No.: 16/000,683

(22) Filed: Jun. 5, 2018

Related U.S. Application Data (60) Provisional application No. 62/516,769, filed on Jun. 8, 2017.

(51) Int. Cl.
  *C01B 6/21* (2006.01)
  *C01B 35/02* (2006.01)

(52) U.S. Cl.
  CPC ............. *C01B 6/21* (2013.01); *C01B 35/026* (2013.01); *C01P 2004/38* (2013.01)

(58) Field of Classification Search
  CPC ....... C01B 6/21; C01B 35/026; C01P 2004/38
  See application file for complete search history.

(56) References Cited

U.S. PATENT DOCUMENTS

| 3,515,522 A | 6/1970 | Pecak et al. |
| 2004/0105805 A1 | 6/2004 | Zidan |

OTHER PUBLICATIONS

Vitalie et al. "Probing the structure, stability and hydrogen storage properties of calcium dodecahydro-closo-dodecaborate" Journal of Solid State Chemistry 183 (2010) 1133-1140 (Year: 2010).*
Kim et al. "Reversible hydrogen storage in calcium borohydride Ca(BH4)2" Scripta Materialia 58 (2008) 481-483 (Year: 2008).*
White, et al., "Understanding and Mitigating the Effects of Stable Dodecahydro-closo-dodecaborate Intermediates on Hydrogen-Storage Reactions", The Journal of Physical Chemistry,C, vol. 120, 2016, pp. 25725-25731.
Newhouse, et al., "Reversibility and Improved Hydrogen Release of Magnesium Borohydride", Journal of Physical Chemistry C, vol. 114, 2010, pp. 5224-5232.
Ozolins, et al., "First-Principles Prediction of a Ground State Crystal Structure of Magnesium Borohydride", Physical Review Letters, vol. 100, Apr. 2008, pp. 135501-1-135501-4.
Paskevicius, et al., "Metal Borohydrides and Derivatives— Synthesis, Structure and Properties", Chem. Soc. Rev., Royal Society of Chemistry, vol. 46, 2017, pp. 1565-1634.

(Continued)

*Primary Examiner* — Anthony J Zimmer
*Assistant Examiner* — Syed T Iqbal
(74) *Attorney, Agent, or Firm* — Medley, Behrens & Lewis, LLC (57) ABSTRACT

A method for obtaining solid-state metal borohydrides without toxic precursors and expensive solvents includes dry mixing of metal hydrides and metal polyhydro-closo-borate starting materials. High pressure and heating is also used in the method. These materials can be used for hydrogen storage, general reducing agents, organic synthesis, wastewater treatment, and paper pulp bleaching.

20 Claims, 6 Drawing Sheets

(56) References Cited

OTHER PUBLICATIONS

Iqbal, Syed Taha, "Office Action for U.S. Appl. No. 15/812,254", dated Nov. 16, 2020, 8 pages.
Iqbal, Syed Taha, "Restriction Requirement for U.S. Appl. No. 15/812,254", dated Sep. 25, 2020, 7 pages.
Vajo, John J. et al., "Boron-Based Hydrogen Storage: Ternary Borides and Beyond", Final Research Report, HRL Laboratories, LLC, DE-EE0006630, Apr. 28, 2016, 51 pages.

* cited by examiner

SOLID STATE SYNTHESIS OF METAL BOROHYDRIDES

CROSS-REFERENCE TO RELATED APPLICATION

This application claims the benefit of priority of U.S. Provisional Patent Application Ser. No. 62/516,769, filed Jun. 8, 2017, and entitled "Solid State Synthesis of Alkali Metal Borohydrides," the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

FIELD

This disclosure relates to methods of making metal borohydrides useful, for example, for energy storage materials.

BACKGROUND

Metal borohydrides are versatile reducing agents. Major applications include organic synthesis, wastewater treatment, and paper pulp bleaching. Additionally, metal borohydrides can be used as hydrogen storage media. Hydrogen-based energy storage systems are known and have been investigated as solutions for powering many technological developments including, in particular, electric vehicles. Hydrogen-based energy is particularly desirable because hydrogen gas reacts cleanly with air in a fuel cell, producing power with water as the only by-product. Such systems face challenges that have not, as of yet, found a suitable solution. It would be advantageous to improve the ease and affordability of synthesis of these materials.

Boron-based hydrogen storage materials have the potential to meet the density requirements for hydrogen storage applications given boron's low atomic weight, high chemical valence, and versatile chemistry. Metal borohydride systems have the potential to solve these problems. However, conventional methods to generate metal borohydrides are rather problematic, and often involve toxic precursors and expensive solvents.

Two main classes of metal borohydrides are anion-substituted compounds in which the $BH_4^-$ anion of the borohydride is replaced by another anion, such as a halide or amide ion; and metal borohydrides modified with neutral molecules such as $NH_3$ or other nitrogen containing compounds. Typically, in the hydrogenated state (outside of extreme operating conditions), such compositions comprise a metal amide and a metal hydride and, in the dehydrogenated state, the materials of such compositions comprise a metal imide and a metal. Bulk metal amides have several drawbacks including limited cycle-life, occurrence of stable nonreactive imide species, and contamination of hydrogen with ammonia gas. Ammonia release irreversibly damages the hydrogen storage material since it removes nitrogen from the material, leading to reduced capacity. In addition, bulk metal nitrides form as the end products and are known to be reluctant towards hydrogenation, adversely affecting the kinetics of the hydrogenation reaction needed for a fully cycling material. Although contributing to the high hydrogen densities, the high valence of boron also leads to slow rates of hydrogen release and absorption (i.e., hydrogen exchange) due to extensive boron-boron atom rearrangements during hydrogen cycling. This rearrangement often leads to multiple solid phases forming during hydrogen release and recharge cycles.

Metal borohydrides can be used for numerous other applications, but synthesizing them on a large scale without environmentally unfriendly/expensive solvents or precursors has not been achieved.

SUMMARY

In an embodiment, a process for making a metal borohydride includes the steps of: mixing without solvent a metal polyhydro-closo-borate and a metal hydride under an inert atmosphere to form a mixture; charging hydrogen gas to the mixture at a pressure of at least approximately 25 MPa, and heating the mixture at a temperature of approximately 350° C. to 540° C. to produce a metal borohydride product. The metal in the metal polyhydro-closo-borate and the metal hydride is selected from the group consisting of Li, Na, K, Rb, and Cs.

The above description presents a simplified summary in order to provide a basic understanding of some aspects of the systems and methods discussed herein. This summary is not a comprehensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Disclosed herein is a method of obtaining solid-state metal borohydrides without toxic precursors and expensive solvents. These materials can be used for hydrogen storage, general reducing agents, organic synthesis, wastewater treatment, and paper pulp bleaching. A new solvent-free approach to making metal borohydrides utilizing polyhydro-closo-borate starting materials is disclosed herein.

In an embodiment, the method involves hydrogenation of solvent-free mechanical mixtures of metal hydrides and the corresponding metal polyhydro-closo-polyborates such as $M_2B_{10}H_{10}$ and $M_2B_{12}H_{12}$, where the metal is metal selected from the group consisting of Li, Na, K, Rb, or Cs. In an embodiment, the method disclosed herein of forming metal borohydrides is that the metal polyhydro-closo-borate starting materials are readily synthesized and commerically available in high purity, and the method produces a product of high purity.

In an embodiment, the method disclosed herein involves hydrogenation of mechanical mixtures of metal hydrides and the corresponding metal polyhydro-closo-polyborates according to one or more of the following reactions:

(A)

(B)

wherein M is a metal selected from the group consisting of Li, Na, K, Rb, and Cs. Reactions A and B show metal polyhydro-closo-borate and the metal hydride mixed in stoichiometric amounts. In an embodiment, the metal hydride and the metal polyhydro-closo-borate are mixed in a molar ratio of 5 to 24 metal hydride to 1 metal polyhydro-closo-borate, such as 6 to 20:1 or 7 to 14:1.

The preparation of dodecahydro-closo-dodecaborate compounds ($M_2B_{12}H_{12}$) can be performed as disclosed in "Understanding and Mitigating the Effects of Stable Dodecahydro-closo-dodecaborate Intermediates on Hydrogen-Storage Reactions", James L. White, Rebecca J. Newhouse, Jin Z. Zhang, Terrence J. Udovic, and Vitalie Stavila, J. Phys. Chem. C 2016, 120, 25725-25731, incorporated herein by reference.

In another embodiment, two or more different starting materials may be used, e.g., corresponding to the reactants of reaction schemes (A) or (B) above and the metal in each reaction can be selected from the group consisting of: Li, Na, K, Rb, and Cs.

Borohydrides of alkali metals display a high hydrogen content; however, their decomposition temperatures are rather high. In contrast, most of transition metal borohydrides, especially those of 3d metals, are thermally unstable. The presently described dry mixing method of synthesis is not applied to transition metal borohydrides because of their low thermal stability.

The synthesized crystalline solid is in a single phase, meaning it is essentially free of starting materials and other impurity phases in the hydrogenated state. This can be determined through XRD as disclosed in the examples herein. The XRD pattern of a composition that is essentially free of impurities has a well-defined set of peaks and integration of peaks attributed to a different phase that is 1% or less of the total peak area for those peaks attributed to the single dominant phase. The absence of impurity phases is believed to be a factor in improved hydrogen cycling reaction kinetics.

Certain characteristics of the metal borohydride material can be modified by varying its electronegativity. The electronegativity of the selected metals can be, for example, from 0.98 to 0.79 (Pauling scale) for the alkali metals.

In an embodiment, such as when used for hydrogen storage, the metal borohydride also includes a catalytic amount of one or more catalytic additives such as potassium compounds to improve the kinetics of both dehydrogenation and rehydrogenation. For example, a catalytic amount may be about 0.01 to 5 mole percent, such as 0.1 to 3 mole percent, or 1.5 to 3.5 mole percent.

In an embodiment, one or more catalysts may be selected from titanium trichloride, titanium tetrachloride, titanium hydride, niobium chloride, metallic nickel, nickel chloride, and combinations thereof. Further, the catalyst can include other materials, such as, but not limited to, aluminum, aluminum hydride, $AlCl_3$, $MnCl_2$, $TiCl_3$, $TiF_3$, $FeCl_2$, $CoCl_2$ and combinations thereof. By incorporating catalysts in the storage material, a higher hydrogen storage capacity can be achieved. It is anticipated that these catalysts are present in such small amounts that they do not affect the isomorphic crystalline structure or the metal borohydrides, which are so designed as to prevent undesired phase segregation.

Although other additives or catalysts may be present in a metal borohydride material, in embodiments the materials of the present application predominantly or essentially consist of the metal borohydride.

In an embodiment, the process of making the alkali borohydride includes mechanically mixing dry reagents under an inert atmosphere (e.g., nitrogen, helium, or argon), followed by charging with high pressure hydrogen and heating. In an embodiment, the yield of the reaction is high, e.g., the $MBH_4$ compound may be produced at a yield of 80% by weight or higher, such as 85% to 97%, or 95% to 99%.

The initial reactants are metal hydrides with anhydrous metal polyhydro-closo-polyborates, such as $M_2B_{10}H_{10}$ and $M_2B_{12}H_{12}$. The nature of metal polyhydro-closo-polyborates and their chemical properties is determined by the presence of delocalized electrons and the aromatic character of the chemical bonding. The pseudoaromatic nature of the closo-borates of general formula $[B_nH_n]^{2-}$ is a factor for their unique properties compared with nido-, hypho-, arachno-, or klado-boranes. These properties may include high thermal and kinetic stability, salt-like behavior, and tendency to undergo B-H substitution rather than B-B bond-breaking reactions.

In an embodiment, the metal in the metal polyhydro-closo-borate and the metal hydride is selected from the group consisting of Li, Na, K, Rb, and Cs. In an embodiment, the metal of the metal hydride should correspond to the metal of the metal polyhydro-closo-polyborate. That is, both the metal hydride and metal polyhydro-closo-borate reactants should have the same metal.

Both the metal polyhydro-closo-borate and the metal hydride are solids. The polyhydro-closo-borate and the metal hydride solids are added (typically as powders) to a mixer, such as a ball mill, an industrial solids mixer, or even a manual mixer such as a mortar and pestle. The mixer homogenizes the blend and further reduces the size of the powder particles. The time of mixing and power applied should be sufficient to homogenize and powderize the reactants to small particle sizes.

The catalysts or dopants mentioned above can be incorporated in the material by adding them to the powdered initial reactants or to the powdered metal borohydride product of the dry mix process. This allows for a one-pot synthesis of a catalyzed mixed-metal borohydride or for a versatile uncatalyzed metal borohydride that can be mixed later with additives. The powdered materials can be pelletized, compacted, or formed into a suitable form for the intended use.

After mixing, the reaction mixture is then charged with high pressure hydrogen gas. This is in an enclosed container and the hydrogen pressure may be, for example, approximately 25 to 105 MPa, such as, 35 to 95 MPa, or 45 to 70 MPa.

The charging of hydrogen can be done while heating the mixture at 350° C. to 540° C., such as, for example, 375° C. to 525° C., or 400° C. to 490° C. In an embodiment, the heating is to a temperature near the melting point of the resulting metal borohydride. In an embodiment, the heating continues until the reactant mixture is melted. The heating can begin or finish prior to the charging of the hydrogen. Since temperature and pressure vary proportionally, the lowest pressure referred to above would be measured at the lowest temperature and the highest pressure referred to above would be measured at the highest temperature during the heating and charging step. The temperature and pressure can be determined in the enclosed reaction vessel using thermocouples and pressure transducers, respectively.

In an embodiment, the method provides highly pure $MBH_4$ (M=Li, Na, K, Rb, or Cs) compounds free of the usual contamination introduced by solvents or other chemicals. The $MBH_4$ compound may be, for example, 97% or greater purity (by weight), such as 98 to 100%, or 99 to 99.9% purity. Unlike conventional methods, the as-synthesized borohydride compounds are generated as solvent-free powders, making them easy to transport and add into other compositions.

In an embodiment, the metal borohydrides can be used as a reducing agent for many industrial reactions.

In an embodiment the metal borohydrides can be used for hydrogen storage and release. In this context, a metal borohydride formed by the method disclosed herein includes an isomorphic crystalline solid corresponding to formula (1) in a hydrogenated state:

$$M(BH_4) \tag{1}$$

In a dehydrogenated state the hydrogen-storage material corresponds to the boride of formula 2:

$$MB \tag{2}$$

M is one or more metals selected from the group consisting of Li, Na, K, Rb, and Cs. The metal M is selected to form cubic (including simple cubic, body centered cubic, and face centered cubic), tetragonal, trigonal, hexagonal, orthorhombic, or monoclinic structures.

In an embodiment of the process for using the metal borohydride for hydrogen storage and release, the metal borohydride can be heated and pressurized to release the hydrogen. Additional catalytic additives such as $TiH_2$ or Ni can also be used. In the hydrogenated state, the metal borohydride material can contain, in theory, up to 18.4 wt % hydrogen, such as 11.5 to 18%, or 12 to 15% hydrogen based on the total weight of the material.

In an embodiment, the metal borohydrides disclosed herein can be used for hydrogen storage and release in materials with loaded hydrogen densities of up to 18 wt % (such as 5% to 15%, or 11% to 14%), or up to 120 g/L (such as 50 to 100 g/L, or 60 to 80 g/L) that can deliver hydrogen and be recharged at moderate temperatures and pressures enabling incorporation into hydrogen storage systems suitable for transportation and stationary applications. These materials ideally have no or very little phase separation, e.g., less than 1%, or less than 0.5% phase impurities by mass.

Instead of a material dedicated to hydrogen storage, the metal hydrides disclosed can be used in many other industrial reactions, such as for use as reducing agents.

EXAMPLES

The following section, describes detailed examples of synthesis and characterization of a mixed-metal borohydride material using the novel and mild methods disclosed herein, producing a hydrogen storage material with improved properties.

Examples 1-3

In examples 1-3 the metal borohydrides $LiBH_4$, $NaBH_4$, and $KBH_4$ were made by the dry mixing method.

The dry $M_2B_{12}H_{12}$ salts (M=Li, Na, K) were ground in a mortar and pestle with their respective metal hydrides (MH) (purchased from Sigma-Aldrich) in a 1:10 molar ratio in an argon-filled glovebox (to prevent rehydration of the $M_2B_{12}H_{12}$ compounds and reaction of the hydrides).

The mixed powders were transferred and loaded into a 25 mL tungsten carbide milling pod with two tungsten carbide balls and milled in a SPEX 8000 high-energy mill for 15 min.

The milled powders were then pressed into thin pellets and loaded into the reaction vessels. The pellets were heated to 500° C. and exposed to 100 MPa $H_2$ for 72 hours, then cooled to room temperature and depressurized.

Figure 1:
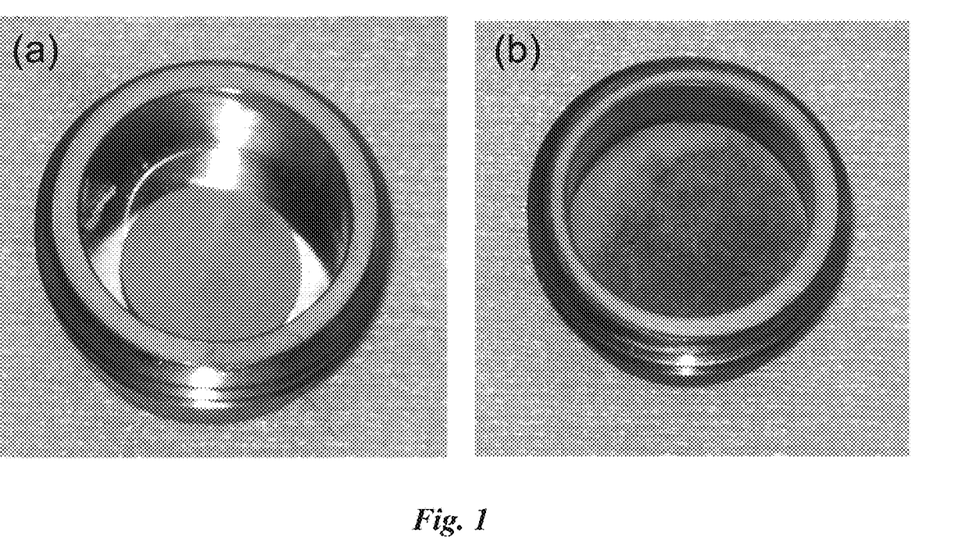
FIG. 1 shows photographs of a pellet of milled $Li_2B_{12}H_{12}+10LiH$, before (a) and after (b) exposure to 100 MPa $H_2$ at 500° C.
Figure 2:
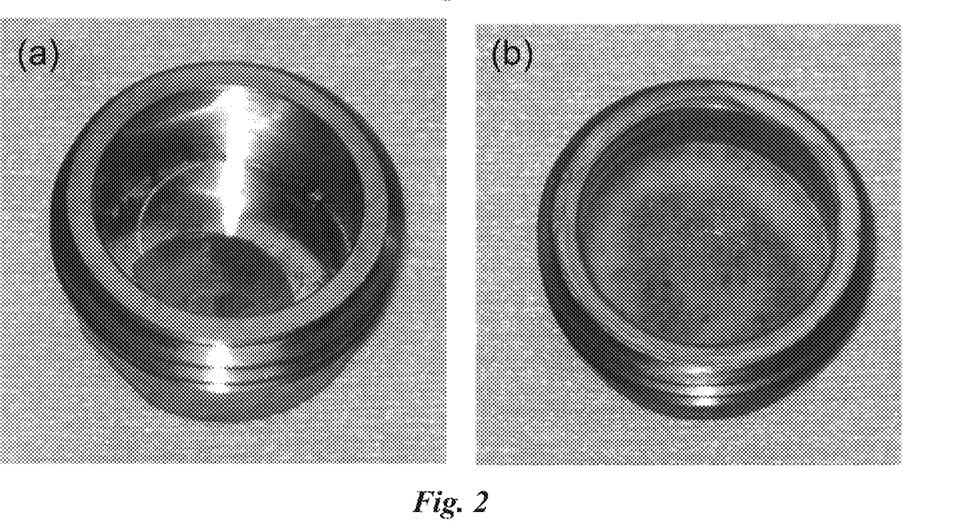
FIG. 2 shows photographs of a pellet of milled $Na_2B_{12}H_{12}+10NaH$, before (a) and after (b) exposure to 100 MPa $H_2$ at 500° C.

A pellet of milled $Li_2B_{12}H_{12}$+10LiH, before and after exposure to 100 MPa $H_2$ at 500° C., is shown in FIG. 1. After heating under high hydrogen pressure, the pellet was observed to spread out and fill the bottom of the vessel, indicating the liquefaction of the material during the course of the reaction, followed by resolidification upon cooling back to room temperature. Similar behavior was found for the sodium mixture, while the potassium pellet merely deformed slightly. FIG. 2 shows the pellet of milled $Na_2B_{12}H_{12}$+10NaH, before and after exposure to 100 MPa $H_2$ at 500° C. While the $M_2B_{12}H_{12}$ compounds persist as solids above 500° C., the borohydrides have melting points of 268, 400, and 585° C. for Li, Na, and K, respectively.

The nearly complete conversion of ball-milled $M_2B_{12}H_{12}$ and MH to $MBH_4$ under high-pressure hydrogen (100 MPa) was confirmed with various characterization techniques.

Figure 3:
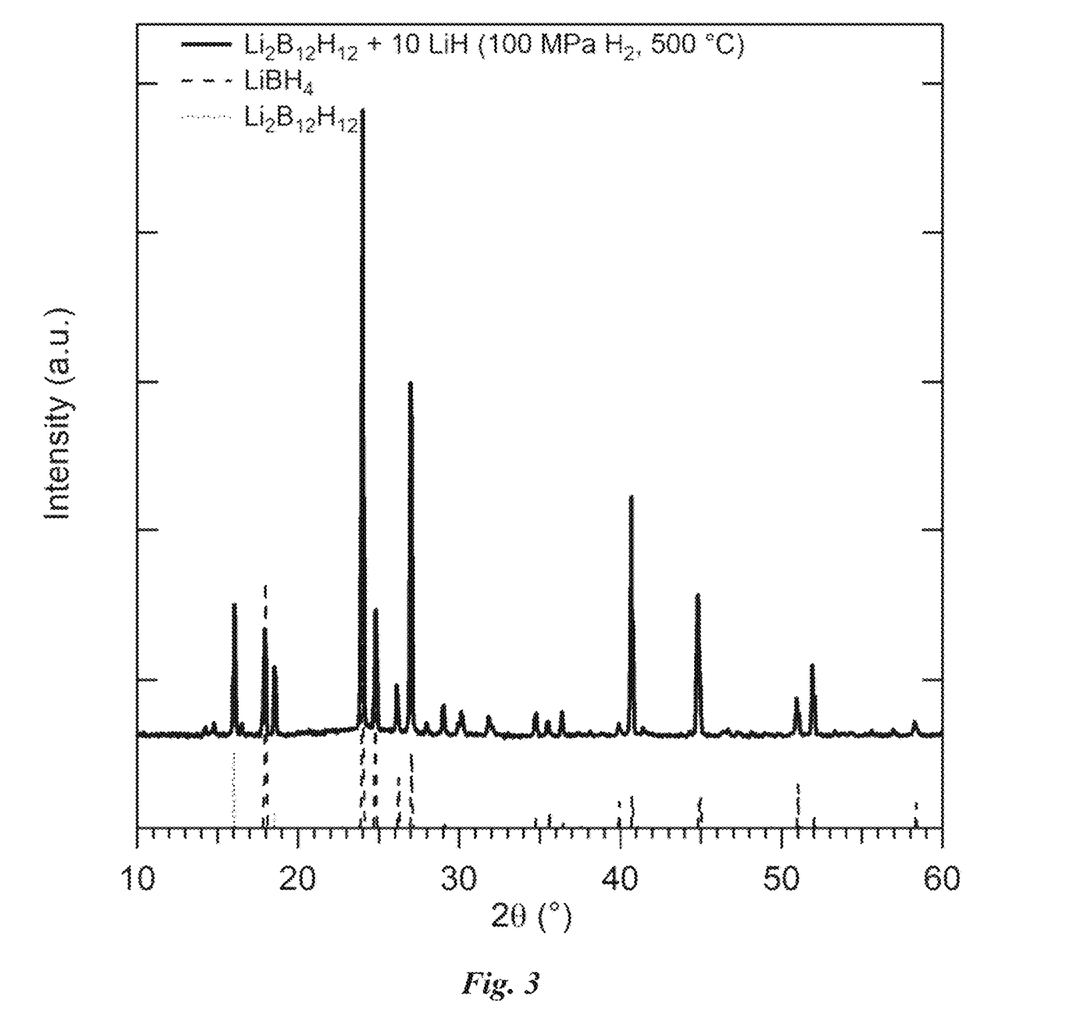
FIG. 3 is a powder X-ray diffraction (XRD) pattern of the product of Example 1.
Figure 4:
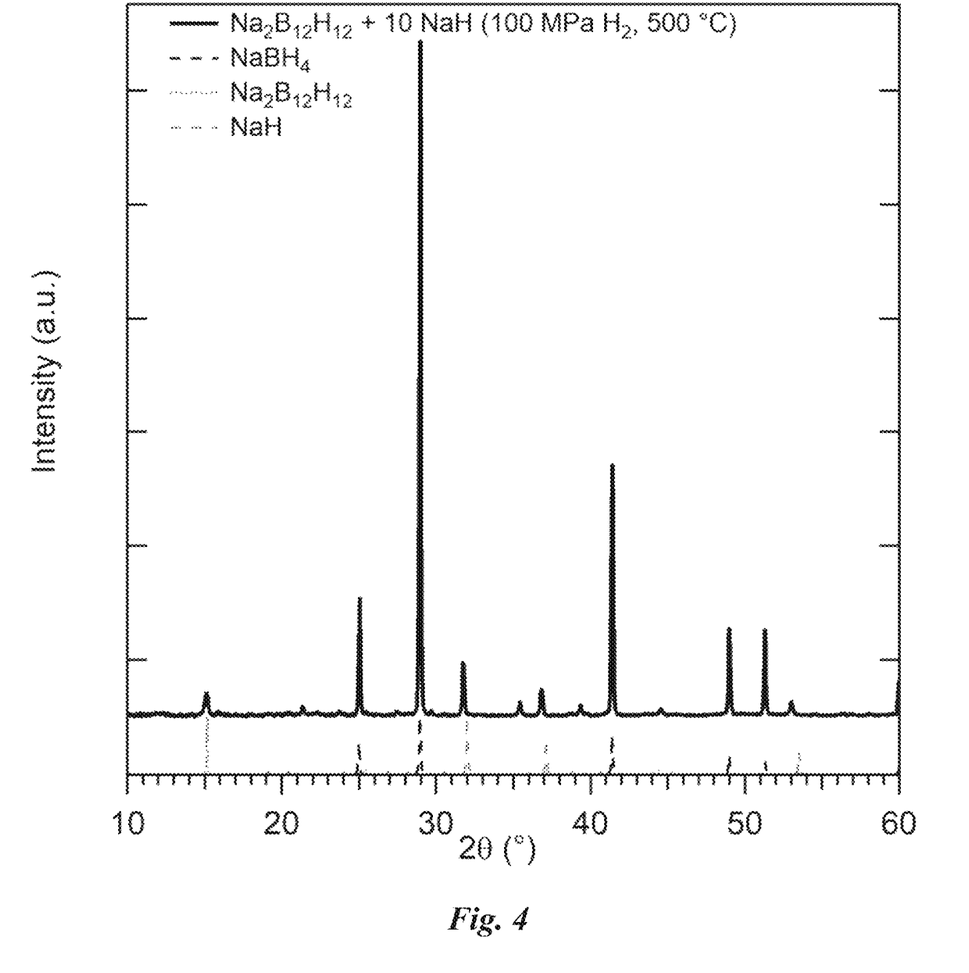
FIG. 4 is a powder XRD pattern of the product of Example 2.
Figure 5:
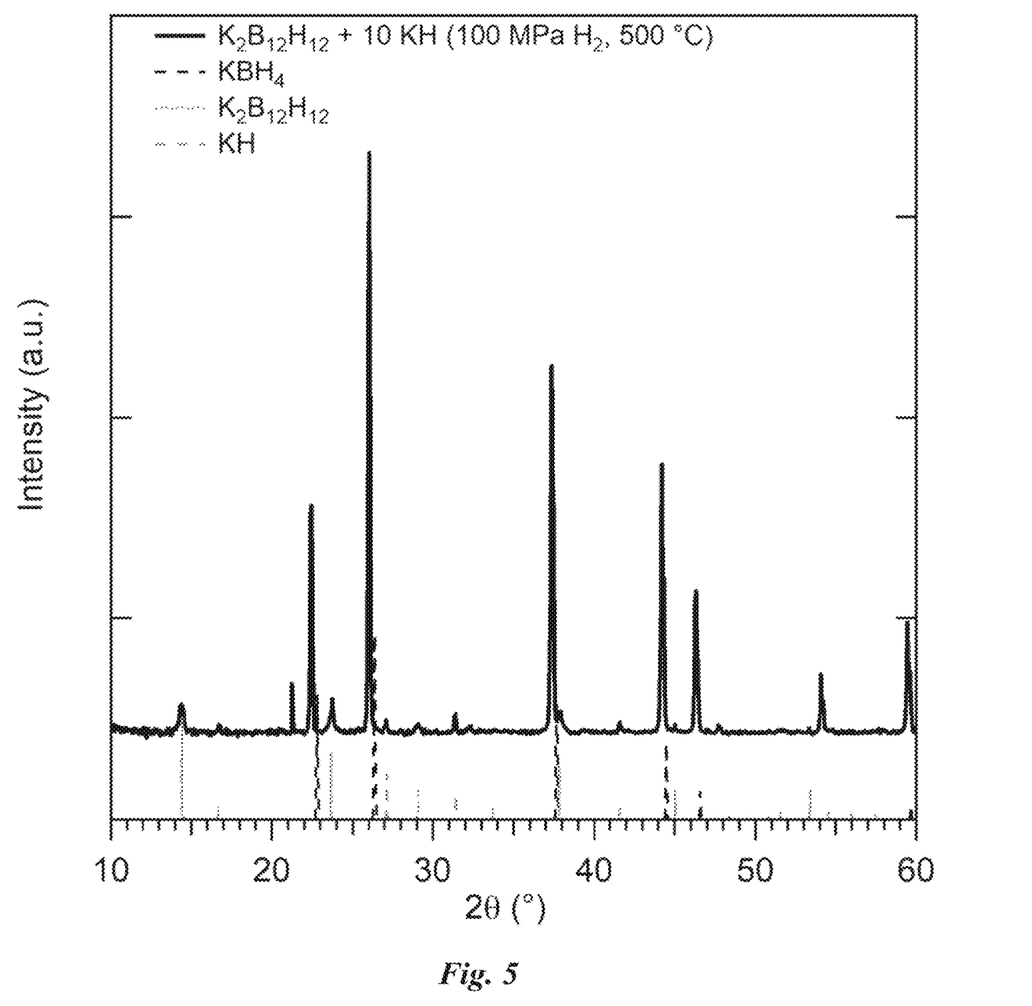
FIG. 5 is a powder XRD pattern of the product of Example 3.

The XRD patterns were obtained with a Panalytical Empyrean diffractometer at 44 kV and 40 mA. See FIGS. 3-5. The air-sensitive samples were loaded into 0.7 mm diameter glass capillaries and sealed with vacuum grease inside an argon-filled glovebox. Following collection of the patterns, the background was subtracted to remove the signal from the amorphous glass.

Raman spectra were also collected for Examples 1-3 using a 532 nm laser with a power of 0.5 mW directed through an Acton Spectropro-275 monochromator/spectrograph with a 600 grooves/mm grating to a liquid-nitrogen-cooled Spec-10 CCD detector.

Neutron vibrational spectroscopy (NVS) measurements were made at temperatures of 4 K at the NIST Center for Neutron Research using the BT-4 Filter-Analyzer Neutron Spectrometer (FANS) with a Cu(220) monochromator and 20 min of arc for the pre- and post-comonochromator collimations. For all figures, standard uncertainties are commensurate with the observed scatter in the data if not explicitly designated by vertical error bars.

The examples were tested with powder X-ray diffraction (XRD). The XRD patterns (FIGS. 2-4) of each of the reaction product mixtures showed primarily crystalline $MBH_4$ in each, with small but detectable quantities of $M_2B_{12}H_{12}$ and MH. These are likely simply unreacted species of $M_2B_{12}H_{12}$ and MH because the equilibrium pressure for the reaction based on calculations is much lower than the experimental conditions.

Kinetic barriers, including slow diffusion of solid-state reactants, likely hindered the completion of the reaction. In all three cases, however, the amount of metal borohydride produced was >80%. Rietveld refinement was employed to characterize the relative amounts of each crystalline phase as shown in Table 1.

TABLE 1

| Alkali Metal | Weight Fraction | | |
|---|---|---|---|
| | $M_2B_{12}H_{12}$ | MH | $MBH_4$ |
| Li | 4.1% | 0.0% | 95.9% |
| Na | 10.2% | 8.9% | 80.9% |
| K | 13.5% | 0.4% | 86.1% |

Figure 6:
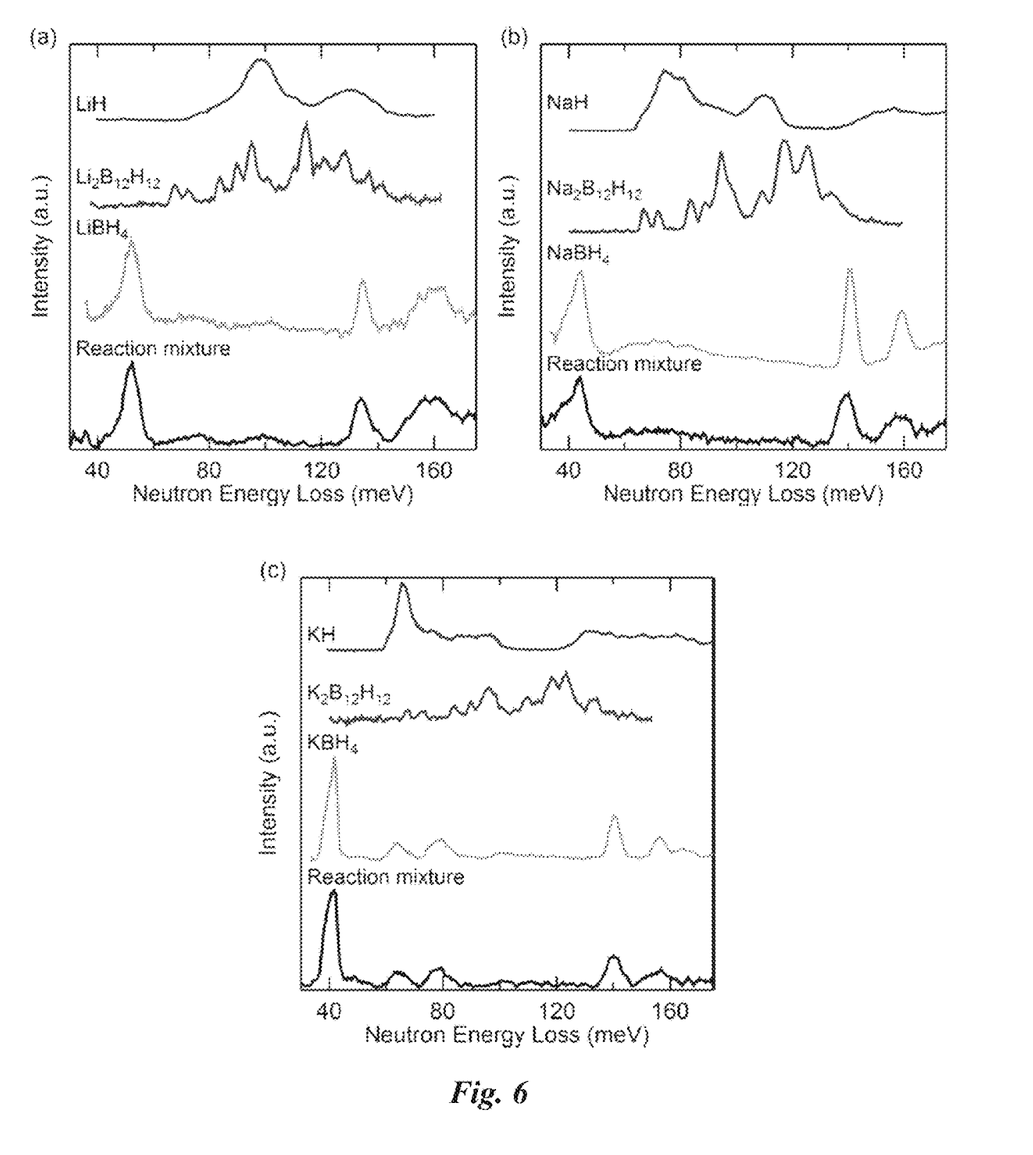
FIG. 6 is neutron vibrational spectra of Examples 1-3 compared with those of the pure individual starting materials and expected borohydride products.
Figure 7:
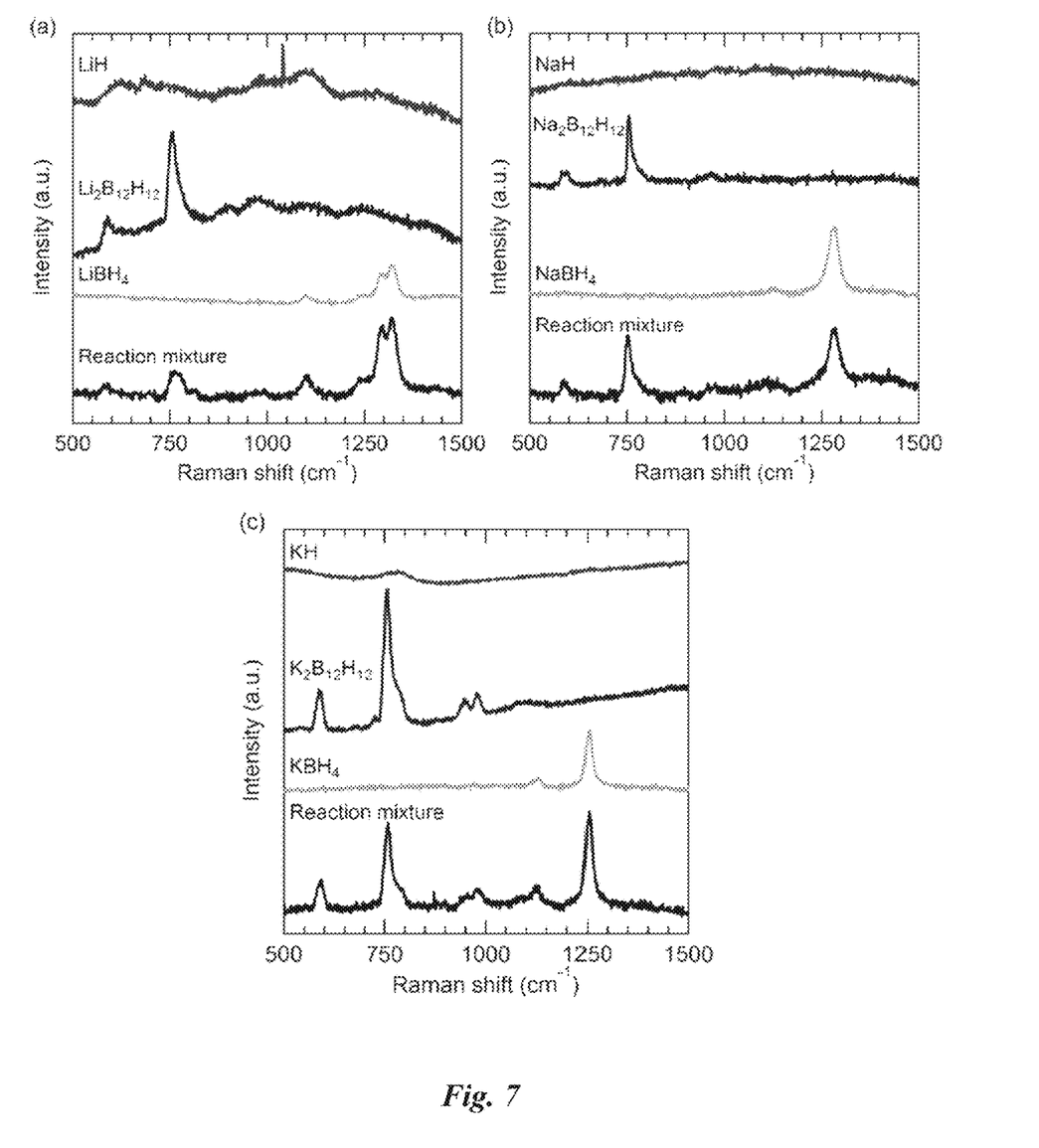
FIG. 7 is Raman spectra of Examples 1-3 compared with those of the pure individual starting materials and expected borohydride products.

XRD does not take into account amorphous phases, including some intermediate boron-hydride species reported in the dehydrogenation of borohydrides. For the detection of such possible products, neutron vibrational spectra (NVS) (FIG. 6) and Raman spectra (FIG. 7) of the final reacted materials were compared with the pure individual starting materials and expected borohydride products. NVS is a summation of all hydrogen scattering, regardless of the species' crystallinity. The NVS comparison spectra also clearly indicate the conversion to borohydride. The reported borohydride libration peaks (52 meV for $LiBH_4$, 44 meV for $NaBH_4$, and 42 meV for $KBH_4$ are readily apparent in the spectra of the corresponding resulting materials. Although the lower intensity combination bands at intermediate energies are less visible, the higher energy bending modes (134 and 158 meV for $LiBH_4$, 140 and 159 meV for $NaBH_4$, and 140 and 156 meV for $KBH_4$) are evident in the product spectra. The peaks for the MH and $M_2B_{12}H_{12}$ species are not discernible above the borohydride combination bands, indicating the presence of, at most, only low levels of those compounds, and no peaks corresponding to other intermediate phases such as $Li_2B_{10}H_{10}$ or $Na_2B_{10}H_{10}$ were present above the detection limit either.

Raman spectroscopy is also sensitive to B-H vibrations and would detect partially hydrogenated species. However, only $[BH_4]^-$ and $[B_{12}H_{12}]^{2-}$ peaks were detected, with no other signals corresponding to $[B_{10}H_{10}]^{2-}$ compounds or other boron hydrides. In the Na Raman spectra, for example, peaks at 589 and 756 cm$^{-1}$ corresponding to B-H bending modes were seen in both the $Na_2B_{12}H_{12}$ starting material as well as the sample after the high-pressure experiment. NaH does not scatter strongly and therefore does not show any distinguishable features that can be recognized in the spectrum of the reacted sample. However, accounting for differences in scattering intensity and the possibility of heterogeneity in the sample, the borohydride species was the majority phase in each of the product mixtures. The presence of highly hydrogenated B-H species in the hydrogenated $Li_2B_{12}H_{12}+10LiH$ sample was further confirmed using temperature-programmed desorption.

In summary, a new synthetic approach towards certain metal borohydrides is disclosed. The reaction occurs by simply exposing mixtures of $M_2B_{10}H_{10}$ or $M_2BH_{12}H_{12}$ with the corresponding metal hydrides to generate $MBH_4$ compounds in high yield.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. The term "essentially free" as used herein means free of or free, except for trace amounts of the specified material. The term "approximately" as used herein means the same as "about."

All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A process for making a metal borohydride, comprising the steps of:
    mixing without solvent a metal polyhydro-closo-borate and a metal hydride under an inert atmosphere to form a mixture;
    charging hydrogen gas to the mixture at a pressure of at least approximately 25 MPa, and heating the mixture at a temperature of approximately 350° C. to 540° C. to produce a metal borohydride product;
    the metal in the metal polyhydro-closo-borate and the metal hydride is selected from the group consisting of Li, Na, K, Rb, and Cs.
2. The process of claim 1, wherein the metal is Li.
3. The process of claim 1, wherein the metal is Na.
4. The process of claim 1, wherein the metal is K.
5. The process of claim 1, wherein the metal is Rb.
6. The process of claim 1, wherein the metal is Cs.
7. The process of claim 1, wherein the metal polyhydro-closo-borate is $M_2B_{10}H_{10}$ or $M_2B_{12}H_{12}$, wherein M is Li, Na, K, Rb, or Cs.
8. The process of claim 1, wherein the metal borohydride product is free of contamination introduced from solvents or other chemicals.
9. The process of claim 1, wherein the temperature is 490° C. to 540° C.
10. The process of claim 1, wherein the pressure is 25 to 105 MPa.
11. The process of claim 1, wherein the metal polyhydro-closo-borate and the metal hydride are mixed in stoichiometric amounts.
12. The process of claim 1, wherein the metal hydride and the metal polyhydro-closo-borate in the mixing step are in a molar ratio of 5 to 24 metal hydride to 1 metal polyhydro-closo-borate.
13. The process of claim 1, wherein the metal borohydride product is 97% or greater purity by weight without further purification steps.
14. The process of claim 1, wherein the metal is one metal selected from the group consisting of Rb and Cs.
15. The process of claim 1, further comprising mixing a catalyst or dopant in the mixing step.
16. The process of claim 1, wherein the metal borohydride product has an isomorphic crystalline structure selected from the group consisting of: cubic, orthorhombic, tetragonal, hexagonal, trigonal, or monoclinic.
17. The process of claim 1, wherein the mixing without solvent is performed in a ball mill.
18. The process of claim 1, wherein the metal borohydride compound is produced at a yield of 80% by weight or higher.

19. The process of claim 10, wherein the pressure is 70 to 105 MPa.

20. The process of claim 1, wherein the charging and heating is performed until the mixture melts.

* * * * *